(12) United States Patent
Berrezag et al.

(10) Patent No.: US 11,192,141 B2
(45) Date of Patent: Dec. 7, 2021

(54) VIBRATING ACTUATOR

(71) Applicant: Lofelt GmbH, Berlin (DE)

(72) Inventors: Amir Berrezag, Berlin (DE); Daniel Büttner, Berlin (DE)

(73) Assignee: Lofelt GmbH, Berlin (DE)

(*) Notice: Subject to any disclaimer, the term of this patent is extended or adjusted under 35 U.S.C. 154(b) by 304 days.

(21) Appl. No.: 16/099,879

(22) PCT Filed: Mar. 23, 2017

(86) PCT No.: PCT/EP2017/056974
§ 371 (c)(1),
(2) Date: Nov. 8, 2018

(87) PCT Pub. No.: WO2017/194239
PCT Pub. Date: Nov. 16, 2017

(65) Prior Publication Data
US 2019/0143371 A1   May 16, 2019

(30) Foreign Application Priority Data

May 11, 2016  (DE) .................... 10 2016 108 690.8

(51) Int. Cl.
*H02K 33/00* (2006.01)
*H02K 7/18* (2006.01)
(Continued)

(52) U.S. Cl.
CPC .............. *B06B 1/045* (2013.01); *G06F 3/016* (2013.01); *H02K 1/34* (2013.01); *H02K 7/1876* (2013.01);
(Continued)

(58) Field of Classification Search
CPC ........ H02K 1/34; H02K 7/4876; H02K 33/00; B06B 1/045
(Continued)

(56) References Cited

U.S. PATENT DOCUMENTS 3,118,022 A    1/1964  Sessler et al.
8,648,502 B2 *  2/2014  Park .................. B06B 1/045
                                          310/25
(Continued)

FOREIGN PATENT DOCUMENTS

CN       1074788 A    7/1993
CN    102859468 A    1/2013
(Continued)

OTHER PUBLICATIONS

International Search Report and Written Opinion; dated Sep. 27, 2017 for PCT Application No. PCT/EP2017/056974.
(Continued)

*Primary Examiner* — Alexander Talpalatski
(74) *Attorney, Agent, or Firm* — Mendelsohn Dunleavy, P.C.; Steve Mendelsohn (57) ABSTRACT

A vibrating actuator is disclosed, comprising: a magnet arrangement including at least one magnet (1); a hollow member (4) comprising at least one coil member (2) with a coil transversally surrounding a cavity (5) forming a longitudinal passageway for receiving the magnet arrangement and permitting a longitudinal relative movement between the hollow member (4) and the magnet arrangement; and elastic means (6) interconnecting the magnet arrangement and the hollow member (4). In one aspect, the elastic means (6) are thin membranes having an oblong shape with transversal indentations (10) on their opposite long sides. In another aspect, at least two magnets (1) are arranged with same polarities facing each other inside a magnet frame (8) at least partially surrounding the magnets (1). Furthermore, methods for assembling the magnet arrangement of a vibrating actuator, the hollow member of a vibrating actuator, and the overall vibrating actuator are disclosed.

25 Claims, 7 Drawing Sheets

(51) Int. Cl.
  *B06B 1/04* (2006.01)
  *G06F 3/01* (2006.01)
  *H02K 1/34* (2006.01)

(52) U.S. Cl.
  CPC ....... *H02K 33/00* (2013.01); *G06F 2203/013* (2013.01)

(58) Field of Classification Search
  USPC .......................................................... 310/15
  See application file for complete search history.

(56) References Cited

U.S. PATENT DOCUMENTS

| | | | |
|---|---|---|---|
| 9,086,728 B2 | 7/2015 | Roselier et al. | |
| 9,614,425 B2* | 4/2017 | Jin | H02K 33/12 |
| 9,859,781 B2* | 1/2018 | Wang | H02K 33/16 |
| 10,076,771 B2* | 9/2018 | Xu | H02K 1/34 |
| 10,218,250 B2* | 2/2019 | Berrezag | H02K 15/00 |
| 2003/0036364 A1 | 2/2003 | Chung | |
| 2010/0066180 A1 | 3/2010 | Ries | |
| 2012/0049660 A1* | 3/2012 | Park | B06B 1/045 310/25 |
| 2014/0084710 A1* | 3/2014 | Endo | B06B 1/045 310/25 |
| 2014/0346901 A1 | 11/2014 | Hayward et al. | |
| 2015/0349619 A1 | 12/2015 | Degner et al. | |
| 2017/0019008 A1* | 1/2017 | Berrezag | H02K 15/00 |
| 2017/0171469 A1 | 6/2017 | Sekimoto | |
| 2017/0214307 A1 | 7/2017 | Katada | |
| 2017/0216884 A1* | 8/2017 | Katada | H02K 33/16 |
| 2017/0317568 A1* | 11/2017 | Ishii | B06B 1/045 |
| 2018/0281020 A1* | 10/2018 | Katada | H02K 33/16 |

FOREIGN PATENT DOCUMENTS

| | | |
|---|---|---|
| DE | 102015111527 A1 | 1/2017 |
| EP | 3002958 A1 | 4/2016 |
| JP | H11-68903 A | 3/1993 |
| JP | H11-510735 A | 9/1999 |
| JP | 2002-200460 A | 7/2002 |
| WO | 97/07650 A1 | 2/1997 |
| WO | 2015/178081 A1 | 11/2015 |
| WO | 2016/017584 A1 | 2/2016 |

OTHER PUBLICATIONS

First Office Action for corresponding Chinese application No. 201780029372.9; dated Apr. 22, 2020; 10 pages (Machine Translation).

Reasons for Refusal for corresponding Japanese application No. 2018-558414; dated Dec. 23, 2020 (6 pages).

* cited by examiner

VIBRATING ACTUATOR

FIELD OF THE INVENTION

The present invention is directed to a vibrating actuator for a variety of applications, for example, a miniature vibrotactile actuator for high-definition haptic feedback to create immersive experiences for video, gaming and music and other immersive experiences.

BACKGROUND AND PRIOR ART

The majority of music we traditionally listen to can be regarded as complex signals resulting from the addition of several signals, e. g., mixed music signals of multiple instruments or voices. With the possibility of electronically recording and reproducing sound, in particular, complex music signals, a further aspect becomes important, namely, the conversion of electric signals to sound waves which are perceived by the listener when the sound is reproduced. In order to reduce distortion problems during reproduction, U.S. Pat. No. 3,118,022 discloses an electroacoustic transducer comprising two conductive members, a diaphragm which includes electret and conductive materials and which is supported between the two conductive members, and a mechanism for electrically connecting to said diaphragm and the two conductive members.

On the other hand, the coupled perception of sound and vibration is a well-known phenomenon. Sound is a mechanical wave that propagates through compressible media such as gas (air-borne sound) or solids (structure-borne sound), wherein the acoustic energy is transported via vibrating molecules and received by the vibrating hair cells in the listener's cochlea. Vibration, on the other hand, is a mechanical stimulus which excites small or large parts of the perceiver's body through a contact surface. The coupled perception of sound and vibration is based on the fact that the human brain receives sound not only through the ears, but also through the skeleton—measurements in a concert hall or church confirm the existence of whole-body vibrations. The body perception of low frequencies is particularly important for an immersive experience of live music or any music sensation that is desired to be pleasurable.

Accordingly, high-definition haptic feedback could be used to create immersive experiences for video, gaming and music and other immersive experiences where the vibration is coupled to continuous audible (or visual) signals. Major requirements for a device to achieve continuous high-definition haptic feedback are:
1. large frequency range, ideally from 20 to 1000 Hz, to be able to generate good quality vibrations over this range, in particular, for music;
2. heavy moving mass, for effective acceleration;
3. small, especially flat, size to make the device portable or wearable;
4. high power efficiency to enable uninterrupted use;
5. silent vibration to avoid disturbance of the sound experience;
6. steady performance to enable continuous use;
7. cost efficient manufacturing to provide an affordable device.

Different vibrating devices to realize a general haptic experience on a person are known such as eccentric motors using an eccentric mass which is attached to the rotating rod of a motor, electroactive polymers which are very similar to piezoelectric motors but with a higher relative mass displacement, and vibrotactile voice-coil or moving magnet-type actuators which are normally used in industrial applications and which use a voice coil or moving magnet-type actuator consisting of two parts one of which is moving and one of which is stationary.

Applicant's DE 10 2015 111 527.1 discloses a vibrating actuator, comprising a magnetic part with magnets arranged with same polarities facing each other, a hollow member with a cavity for receiving the magnetic part and at least one coil wrapped around the hollow member and fixed thereto, elastic means interconnecting the magnetic part and the hollow member, and a chassis, wherein the magnetic part is fixed to the chassis via attachment means such that the magnetic part, the attachment means and the chassis are stationary and wherein the receiving part performs a linear vibratory movement. The elastic means interconnecting the magnetic part and the hollow member can be flat elastic membranes made, for example, of copper beryllium. Furthermore, magnetic guidance means of ferromagnetic material partly surrounding the hollow member and the coils can be mounted to the longitudinally outer ends of the magnetic part for guiding back wasted magnetic field to the magnets. The overall vibrating actuator is manufactured by assembling the magnets of the magnetic part in a dedicated assembly jig using a rod, assembling the moving part by wrapping coils of self-bonding copper wire around the hollow member in the longitudinally central part of the hollow member and heating the coils and the hollow member such that the coils become solid and bind with the hollow member, inserting the magnetic part into the moving part, attaching the elastic interconnecting means to the longitudinally outer ends of the magnetic part and the hollow member, resp., and attaching the magnetic part to the chassis.

In view of the prior art discussed above, there is still a need for an amended vibrating actuator which permits an enhanced guidance of the moving part, a better stress distribution along the membrane and an improved, i.e., easier and cheaper, assembly which results in a device less prone to breakage when exposed to an impact force. Furthermore, the amended vibrating actuator should work in an "inverted" arrangement as disclosed in Applicant's DE 10 2015 111 527.1 as well as in a standard arrangement, wherein the receiving part is stationary and the magnetic part is moving.

SUMMARY OF THE INVENTION

An object of this invention is to provide a flat vibrating actuator which permits an enhanced guidance of the moving part, a better stress distribution along the membrane and an improved, i.e., easier and cheaper, assembly which results in a device less prone to breakage when exposed to an impact force while maintaining acceleration and resonance frequency.

The present invention provides a vibrating actuator, comprising: a magnet arrangement including at least one magnet; a hollow member comprising at least one coil member with a coil transversally surrounding a cavity forming a longitudinal passageway for receiving the magnet arrangement and permitting a longitudinal relative movement between the hollow member (4) and the magnet arrangement; and elastic means interconnecting the magnet arrangement and the hollow member; wherein the elastic means are thin membranes having an oblong shape with transversal indentations on their opposite long sides.

In another aspect, the present invention provides a vibrating actuator, comprising: a magnet arrangement including at least two magnets; a hollow member comprising at least one coil member with a coil transversally surrounding a cavity forming a longitudinal passageway for receiving the magnet arrangement and permitting a longitudinal relative movement between the hollow member (4) and the magnet arrangement; and elastic means interconnecting the magnet arrangement and the hollow member; wherein the at least two magnets are arranged with same polarities facing each other inside a magnet frame at least partially surrounding the magnets.

The present invention also provides a method for assembling the magnet arrangement of a vibrating actuator, comprising the following steps:
positioning a magnet frame on a support surface;
inserting at least two magnets in the magnet frame and gluing the magnets to the magnet frame and to each other.

The present invention furthermore provides a method for assembling the hollow member of a vibrating actuator, comprising the following steps:
providing at least two coil members each having a coil transversally surrounding a cavity forming a longitudinal passageway and at least one spacer having a cavity with the same shape as the cavity of the at least two coil members;
providing a hollow member assembly rod dimensioned to engage the cavities of the at least two coil members and the at least one spacer in several areas such that the at least two coil members and the at least one spacer cannot move transversally to the rod;
providing two hollow member assembly end pieces having a cavity for receiving the hollow member assembly rod such that the hollow member assembly end pieces cannot move transversally to the rod;
consecutively putting
the first hollow member assembly end piece,
the first of the at least two coil members,
the at least one spacer,
the second of the at least two coil members, and
the second hollow member assembly end piece
on the hollow member assembly rod with glue between the members being enclosed by the two hollow member assembly end pieces;
compressing the first and second hollow member assembly end pieces;
removing the second hollow member assembly end piece from the hollow member assembly rod; and
removing the hollow member comprising the at least one spacer and the first and second coil members from the hollow member assembly rod.

The present invention also provides a method for assembling a vibrating actuator, comprising the following steps:
inserting the magnet arrangement assembled according to the above into the hollow member 4 assembled according to the above;
attaching elastic means interconnecting the magnet arrangement and the hollow member on both longitudinal outer ends via attachment means.

Further advantageous features can be obtained from the specification and the claims.

In this application, the term "longitudinal" means in the direction of the linear movement of the moving part of the actuator; accordingly, the term "transversal" means in a direction in the plane orthogonal to the longitudinal direction. The term "long" in connection with the oblong membranes, on the other hand, denominates the longer sides of the membranes in contrast to their shorter sides.

DETAILED DESCRIPTION OF THE PREFERRED EMBODIMENTS

The present invention is directed to a vibrating actuator for a variety of applications. In an exemplary application, a vibrotactile voice-coil or moving magnet-type actuator for high-definition haptic feedback to create immersive experiences for video, gaming and music and other immersive experiences is connected to an audio device via an amplifier like a loudspeaker and via an additional low pass filter to limit the audio frequency range to the tactile perceptible range of the skin. The actuator can be worn, for example, around the user's wrist or other body part like a bracelet.

Figure 1:
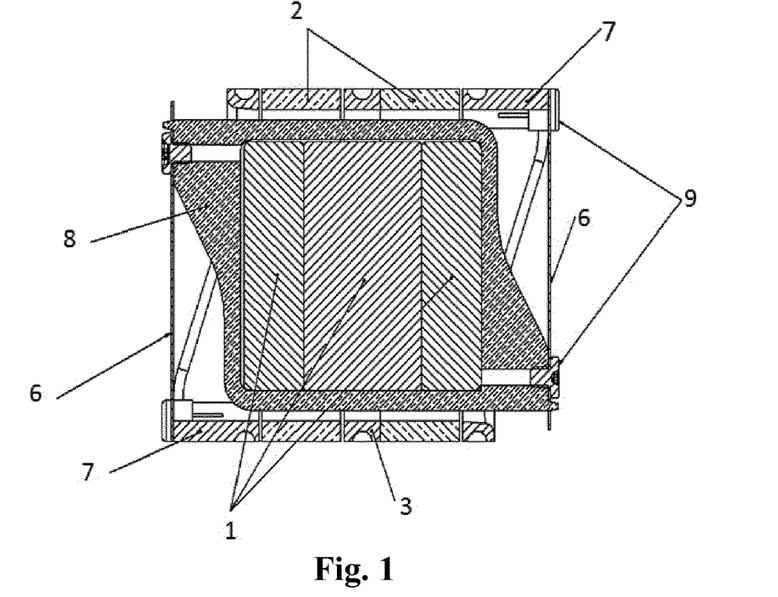
FIG. 1 shows a cross section of the vibrating actuator.

The general arrangement of a preferred embodiment of the actuator is shown in FIG. 1. According to the present invention the actuator comprises a magnet arrangement comprising three magnets 1 and a frame 8 at least partially surrounding the magnets 1, wherein the magnet arrangement is inserted in a hollow member 4 comprising two coil members 2, a spacer 3 between the coil members 2 and two coil membrane interfaces 7 at the longitudinal outer ends of the hollow member, thereby enclosing the coil members 2 from the longitudinal outer ends of the hollow member 4. Each element 2, 3 and 7 of the hollow member 4 has an inner cavity 5 which has the same transversal shape for all elements. In each coil member 2 a coil encloses the cavity 5 of the coil member 2 transversally. In the preferred embodiment the moving part perfoming the linear vibratory movement consists of the magnet arrangement comprising the magnets 1 and the frame 8, whereas the hollow member 4 comprising the coil members 2, the spacer 3 and the two coil membrane interfaces 7 is fixed to a chassis (not shown) and stationary. When an alternating current passes through the coils, it interacts with the magnetic field of the magnets 1 and generates a mechanical force with changing direction on the moving part comprising the magnet arrangement— this results in a linear movement of the moving part with changing direction, causing the vibration.

The three magnets 1 of the magnet arrangement are positioned inside the magnet frame 8, wherein the magnets 1 are each arranged with same polarities facing each other, i.e., north facing north or south facing south, to create a highly concentrated magnetic field in the plane between them. The magnet frame 8 will be described in more detail below.

The hollow member 4 is shaped depending on the shape of the magnet arrangement such that the gap between the coils and the magnets 1 is relatively small in order to reduce the loss of magnetic force. For example, the inner cavity 5 of each element 2, 3 and 7 of the hollow member 4 as well as the outer contour of the hollow member 4 should be flat and oblong if the magnet arrangement comprising the magnets 1 and the frame 8 is flat and oblong, or the internal cavities 5 and the outer contour of the hollow member 4 should be cylindrical and oblong if the magnet arrangement is cylindrical and oblong—of course, there has to be certain spacing between the magnet arrangement and the inner surfaces defining the internal cavities 5 of the elements 2, 3 and 7 of the hollow member 4 to enable the magnet arrangement to move within the cavities 5. The hollow member 4 is attached to the chassis which can be a bracelet worn by a user or at least a casing containing both the actuator and further electronics. The attachment can be, for example, a "clip-in" type attachment and ensure that the hollow member 4 remains stationary (by being attached to the chassis) and maintains the position of the coils. Accordingly, the stationary part comprises the coil members 2, the spacer 3 and the coil membrane interfaces 7. In the resting position of the actuator, the two coil members 2 transversally surround at least the two areas where the same polarities of the magnets 1 face each other (see above) but not the whole length of the arrangement of magnets 1 which is achieved by the spacer 3 between the coil members 2. It is preferred to provide one coil member 2 per area where two magnets 1 face each other with same polarity, i.e., in the embodiment acc. to FIG. 1 there are three magnets 1 and two coil members 2.

The linear movement of the moving part occurs along the longitudinal axis of the actuator (i.e., the longitudinal axis of the magnet arrangement comprising magnet frame 8 with the magnets 1 inserted therein and the hollow member 4 comprising the coil members 2). Each end of the oblong hollow member 4 is open (such that the elements 2, 3 and 7 forming the hollow member 4 form a tube) to allow attachment of two elastic elements 6 to both the coil membrane interfaces 7 and the longitudinally outer ends of the magnet frame 8 on both longitudinal outer ends of the actuator. The attachment of the elastic elements 6 can be obtained by using glue, rivets or screws 9, and if the coil membrane interfaces 7 are omitted the elastic elements 6 are attached directly to the coil members 2. The elastic elements 6 allow the moving magnet part to perform its longitudinal movement back and forth without hitting the stationary part, i.e., the hollow member 4 and the chassis.

It should be noted, however, that the actuator can also have an "inverted" arrangement as disclosed in Applicant's DE 10 2015 111 527.1, wherein the hollow member 4 comprising the coils is the moving part and the magnet arrangement is the stationary part fixed to the chassis, for example, via attachment members extending through slots in the hollow member 4. The novel inventive membrane 6, the magnet arrangement comprising the magnet frame 8 and the manufacturing process for (parts of) the actuator as well as the advantageous effects resulting therefrom—all of which will be discussed in more detail below—are not affected by the choice of the moving and stationary parts, i.e., whether the magnet arrangement moves and the hollow member comprising the coils is stationary or vice versa. Neither is the number of magnets 1 or the order of their polarity or the presence of the spacer 3 and/or the coil membrane interfaces 7 essential for the novel inventive membrane 6 and its advantageous effects—even the minimum arrangement with the membranes 6 interconnecting only one magnet 1 and one coil member 2 with a coil at least partially surrounding the magnet 1 is possible. In view of the inventive magnet frame 8 and the manufacturing process for (parts of) the actuator as well as the advantageous effects resulting therefrom, the magnet arrangement should comprise at least two magnets 1 with same polarities facing each other and the hollow member should comprise at least two coil members 2 and a spacer 3. In the following, the preferred embodiment of the actuator of FIG. 1 with three magnets 1 arranged with same polarities facing each other and the magnet arrangement being the moving part will be used for illustrating the novel inventive membranes 6, the magnet frame 8 and the manufacturing process. This particular embodiment should not be interpreted, however, as limiting the scope of the inventive membrane 6, the magnet arrangement comprising the magnet frame 8 and the manufacturing process for (parts of) the actuator.

Membrane

In order to allow sufficient movement of the moving part (i.e., in the embodiment shown in FIG. 1, the magnet arrangement) for obtaining a strong vibration, the elastic elements 6 have to be highly flexible. At the same time, the elastic elements 6 should occupy relatively little space if the actuator shall be portable or wearable. As disclosed in Applicant's DE 10 2015 111 527.1, sufficiently thin elastic membranes 6 which are made of copper beryllium appear to be ideal for these purposes because the alignment between the moving and the stationary parts of the actuator is much more accurate with metallic membranes than with compression springs or non-metallic membranes and results in guiding the moving part much more accurately through its trajectory as it vibrates—when using material such as rubber, the moving part will wiggle and move through its trajectory with the result that the moving and stationary parts clash as the moving part moves through its trajectory to create the vibration, which, in turn, creates noise and friction, the latter making the actuator less efficient.

Figure 2:
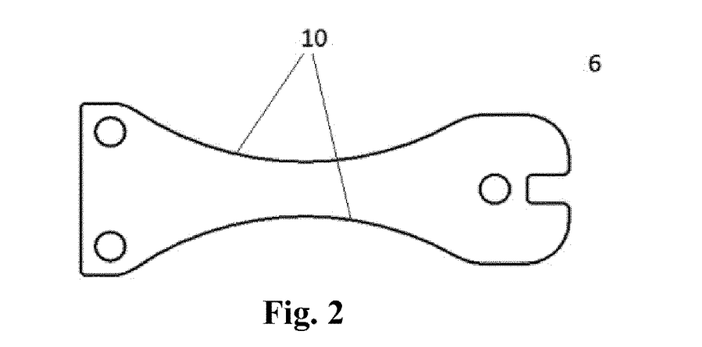
FIG. 2 shows a top view of the membrane.
Figure 3:
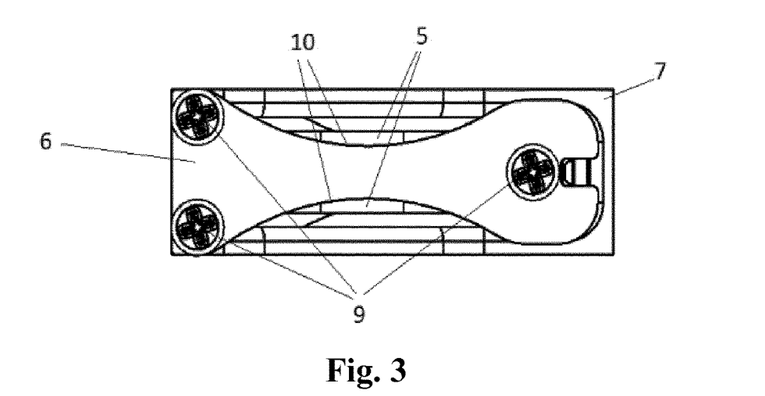
FIG. 3 shows a side view of the vibrating actuator with the membrane installed.

Longer performance tests have shown that copper beryllium as the membrane material has the further advantages of high yield strength and high dynamic fatigue resistance. The performance tests have also shown, however, that even these membranes tend to deteriorate and even break due to the stress imposed on them resulting from the strong vibratory movement of the moving part. Thus, the present invention takes the design of the membranes further by providing novel specially shaped membranes 6 interconnecting the moving and stationary parts of the actuator. The membranes 6 according to the present invention are shown in more detail in FIGS. 2 and 3. At one end they are attached to the coil membrane interfaces 7 of the hollow member and at their other end they are attached to the magnet arrangement, e.g. the magnet frame 8, via rivets, screws 9 or the like to interconnect these two actuator parts elastically, allowing relative movement between these parts. As mentioned above, if no coil membrane interfaces 7 were provided, the membranes 6 could be attached directly to the coil members 2. The inventive membranes 6 have a generally oblong shape, wherein the opposing long sides are provided with recesses or indentations 10 resulting in a bone-like shape of the membrane 6. In FIGS. 2 and 3 these indentations have a concave shape, but other shapes such as polygonal (including triangles, rectangles and higher order polygons) are also possible. With these indentations 10 on its opposing long sides, the membrane 6 has a much better stress distribution than prior art membranes. (In principle, a better stress distribution could also be obtained by using membranes with thickness gradients, an accurate manufacturing thereof, however, is very difficult.) A more or less rectangular membrane without indentations, for example, shows a high stress concentration close to the attachment points at its outer ends when force is applied in the direction of its thickness—which is the case when the actuator vibrates, i.e., when the moving part moves longitudinally relative to the stationary part flexing the membranes in the direction along their thickness (comparable to beam bending). This high stress concentration on the membrane in the attachment areas close to the magnet arrangement and the hollow member can easily lead to membrane breakage in case of continuous operation. In contrast thereto, the inventive membrane 6 with its indentations on the opposing long sides shows a relatively even stress distribution along the whole membrane 6 when being flexed such that the inventive membrane 6 has a considerably higher resistance to fatigue and permits a longer working life due to the avoidance of high stress concentration in specific areas. The curved indentations lead to a transversal width of every section of the membrane 6 which is proportional to the applied stress: A section exposed to high stress is wider (i.e., has a larger transversal width), whereas a section exposed to low stress is narrower (i.e., has a smaller transversal width).

The inventive membrane is ideal, in particular, for flat rectangular actuators which are preferred for applications where small size matters such as when the actuator is used around the user's wrist or other body part like a bracelet. In the case of a rectangular magnet arrangement it is challenging to guide the moving magnet arrangement comprising the magnets 1 inside the hollow member 4 comprising the coils without friction. Friction creates noise and is, thus, particularly undesirable for devices designed to enhance musical experience or the like. A minor rotation of the magnet arrangement around its longitudinal axis will result in friction between the moving magnet arrangement and the hollow member 4. Due to its even stress distribution, the inventive membrane allows a high displacement and at the same time a precise longitudinal guiding of the moving part.

Magnet Frame

In another aspect, the present invention provides a magnet frame 8 at least partially surrounding the magnets 1. As indicated above, in vibrating magnet-type actuators several magnets 1 can be arranged facing each other with the same polarity to allow a high concentration of magnetic field to be generated inside the at least one coil and coil member 2, resp. However, assembling strong magnets with same polarities facing each other is very difficult due to the high repelling force created by the magnetic poles. In the embodiment shown in FIG. 4 the magnet frame 8 has a trapezoidal shape (but other shapes such as, for example, basically rectangular, are also possible) and encloses the magnets 1 like a frame, i.e., such that two opposing sides of the magnet arrangement are open. As a result, on these open sides of the magnets 1 can be positioned closer to the coils and a flat actuator design is possible. The frame can be made of any rigid material suitable for withstanding the strong repelling forces of the magnets 1. The frequency response of the actuator can be adjusted by the choice of the material. However, the material should not be magnetic to avoid that part of the magnetic field is guided away.

Figure 4:
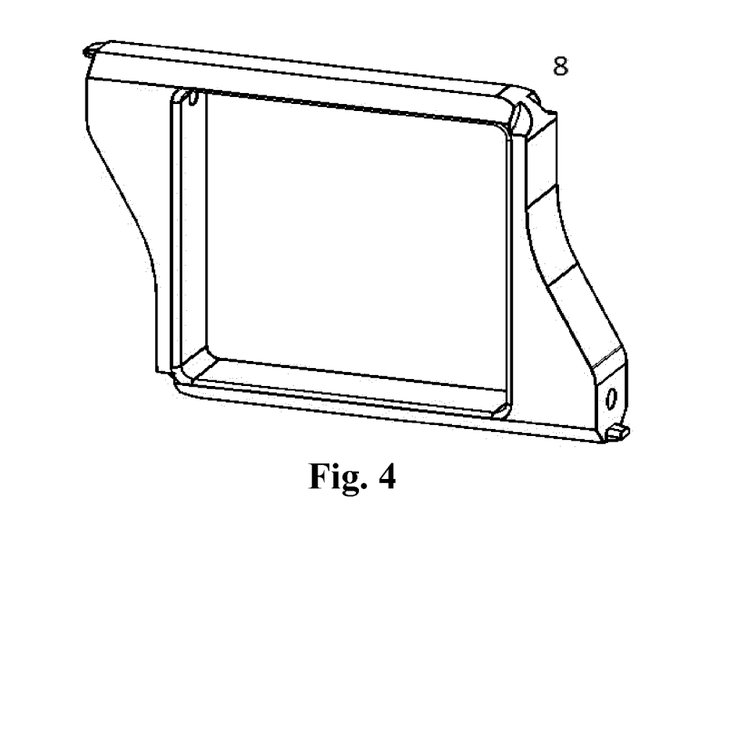
FIG. 4 shows a perspective view of the magnet frame.
Figure 5A:
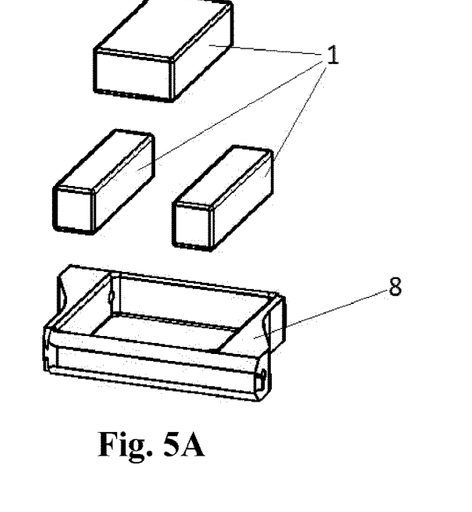
FIG. 5A shows a perspective view of the magnet frame and the three magnets before assembly.
Figure 5B:
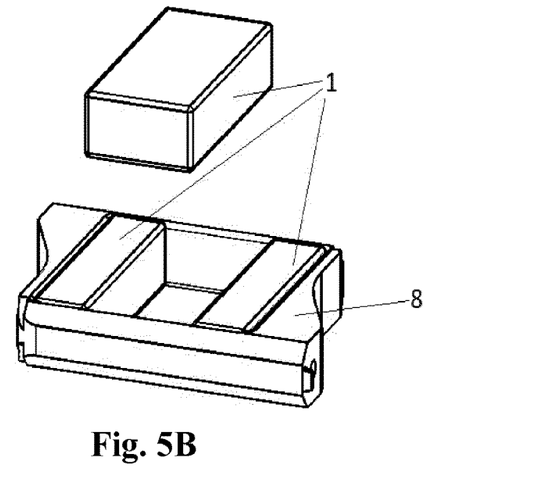
FIG. 5B shows the arrangement of FIG. 5A, wherein now the two outer magnets have been inserted into the magnet frame.
Figure 5C:
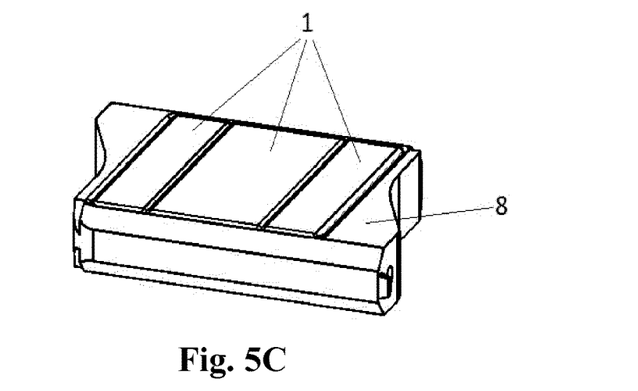
FIG. 5C shows the arrangement of FIG. 5B, wherein now the central magnet has been inserted into the magnet frame between the two outer magnets.
Figure 5D:
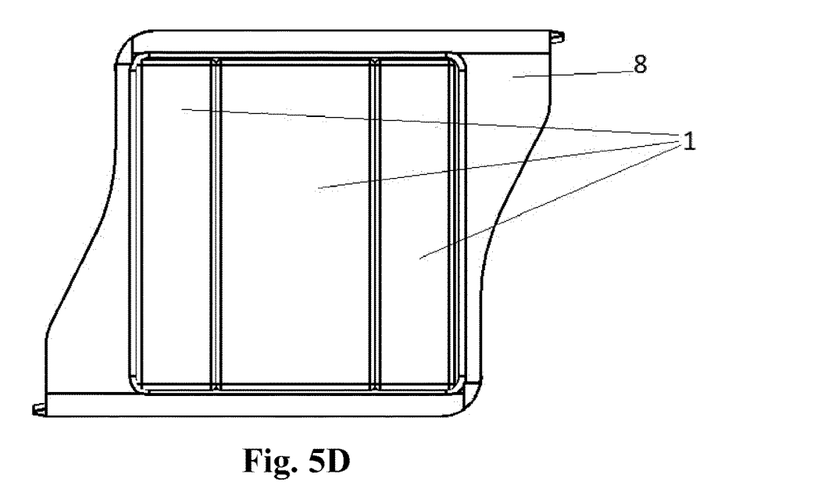
FIG. 5D shows the arrangement of FIG. 5C in a top view.

Assembling the magnet arrangement, i.e., consecutively inserting the magnets 1 in the frame 8, will be described in further detail below. The magnet frame 8 reduces the material/spare part costs and makes the assembly easier and cheaper because instead of having to use an expensive adhesive and custom shaped magnets, the inventive frame 8 permits the use of a common adhesive and standard, i.e., readily available (standard shape), magnets. After gluing, the metallic frame holds the magnets together and also acts as an interface between the magnets 1 and the membranes 6 as already described in connection with the membrane 6 above. Gluing the magnets 1 together without the frame 8 would leave the joints between the magnets 1 under tension—since adhesives are typically weak under tension loads there is a high risk of joint breakage after a shock or collision. Accordingly, providing the magnet frame 8 significantly reduces the risk of breakage when the assembly is exposed to an impact force. In case the magnet arrangement comprising the magnets 1 and the frame 8 is the moving part, the frame 8 adds to its mass and, thus, can be used to adjust the resonance frequency of the actuator.

Manufacturing Method

The manufacturing of the inventive actuator can be divided into three separate parts, namely assembling (i) the magnet arrangement comprising the magnets 1, (ii) the hollow member 4 comprising the coils and (iii) the overall actuator.

(i) Assembling the Magnet Arrangement

FIG. 5A-5*d* show the assembly of the magnet arrangement acc. to the preferred embodiment of FIG. 1 with three magnets 1 which are consecutively inserted in the magnet frame. The general inventive assembly comprises the following steps:

positioning a magnet frame 8 on a support surface;

inserting at least two magnets 1 in the magnet frame 8 and gluing the magnets 1 to the magnet frame 8 and to each other.

In the case of the preferred embodiment acc. to FIGS. 1 and 5A-5D comprising three magnets the step of inserting the magnets 1 in the magnet frame 8 and gluing the magnets 1 to the magnet frame 8 and to each other comprises inserting the two longitudinal outer magnets 1 in the magnet frame 8 and gluing them to the magnet frame at their longitudinal outer ends; and inserting the central magnet 1 in the magnet frame 8 between the two longitudinal outer magnets 1 and gluing the central magnet 1 to the longitudinal outer magnets 1.

(ii) Assembling the Hollow Member

Figure 6:
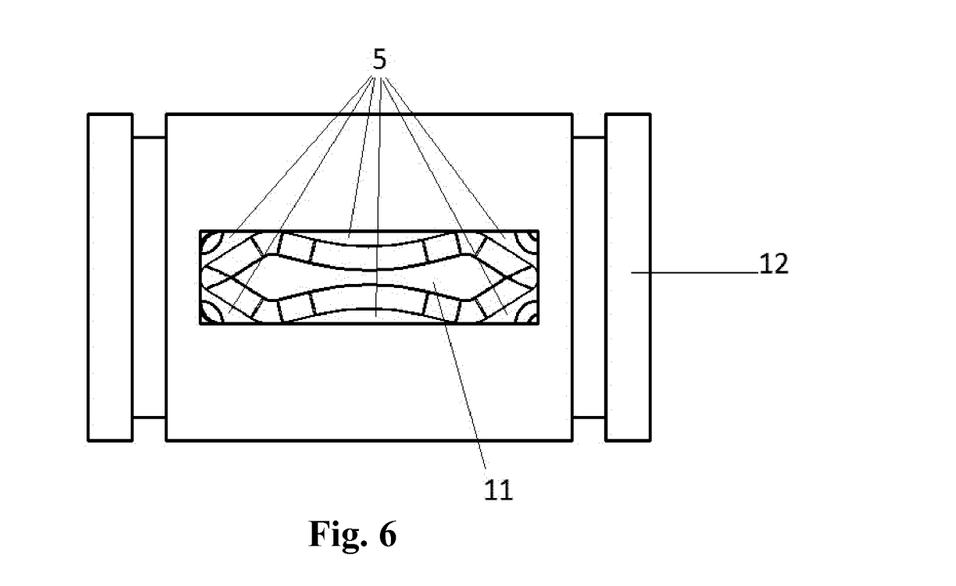
FIG. 6 shows a top view of the hollow member assembly rod.
Figure 7A:
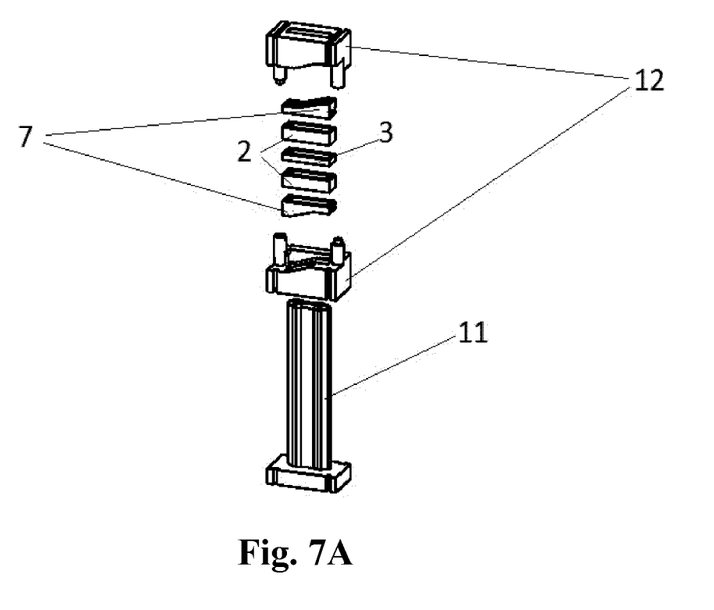
FIG. 7A shows a perspective view of the hollow member assembly rod, the two hollow member assembly end pieces, the two coil membrane interfaces, the two coil members and the spacer before assembly.
Figure 7B:
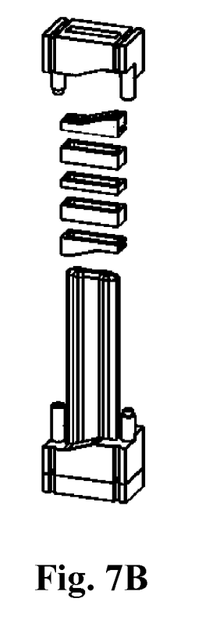
FIG. 7B shows the arrangement of FIG. 7A, wherein now the first hollow member assembly end piece has been inserted on the hollow member assembly rod.
Figure 7C:
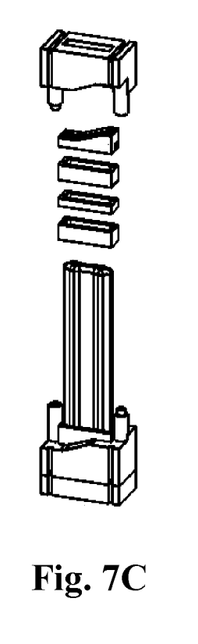
FIG. 7C shows the arrangement of FIG. 7B, wherein now the first coil membrane interface has been inserted on the hollow member assembly rod on top of the first hollow member assembly end piece.
Figure 7D:
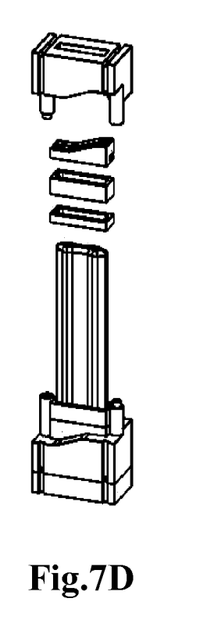
FIG. 7D shows the arrangement of FIG. 7C, wherein now the first coil member has been inserted on the hollow member assembly rod on top of the first coil membrane interface.
Figure 7E:
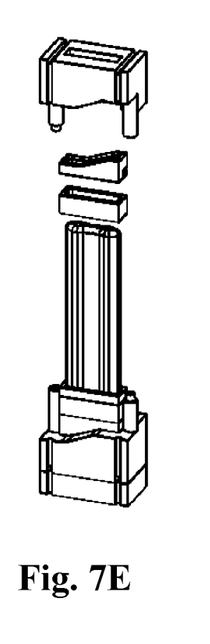
FIG. 7E shows the arrangement of FIG. 7D, wherein now the spacer has been inserted on the hollow member assembly rod on top of the first coil member.
Figure 7F:
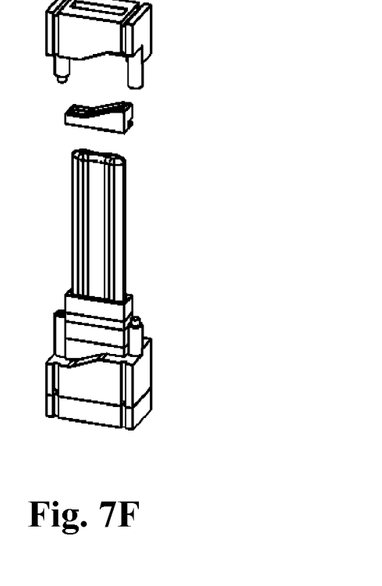
FIG. 7F shows the arrangement of FIG. 7E, wherein now the second coil member has been inserted on the hollow member assembly rod on top of the spacer.
Figure 7G:
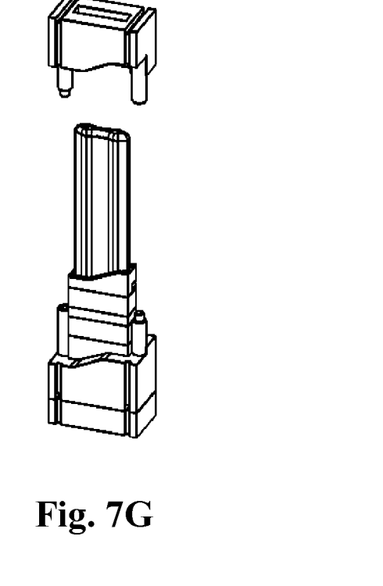
FIG. 7G shows the arrangement of FIG. 7F, wherein now the second coil membrane interface has been inserted on the hollow member assembly rod on top of the second coil member.
Figure 7H:
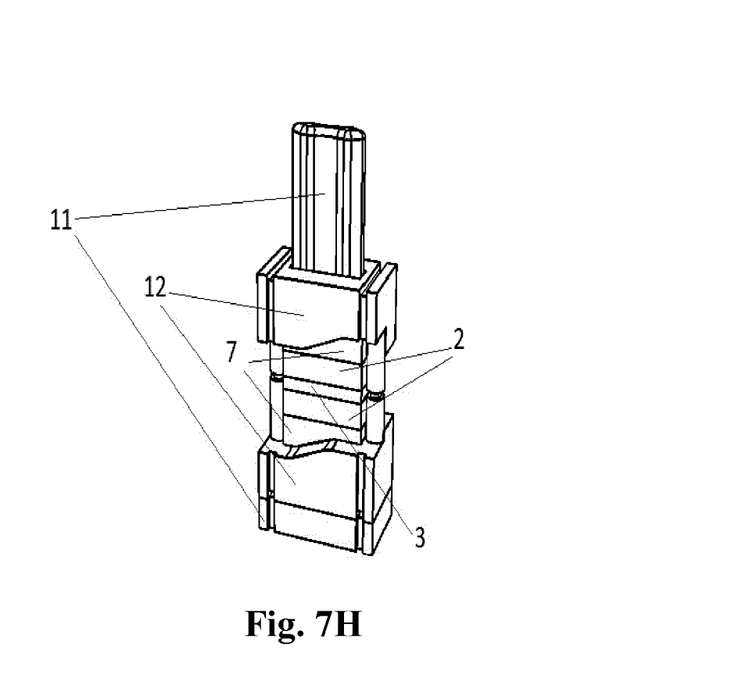
FIG. 7H shows the arrangement of FIG. 7G, wherein now the second hollow member assembly end piece has been inserted on the hollow member assembly rod on top of the second coil membrane interface.

FIG. 6 shows a top view of a hollow member assembly rod 11 and FIG. 7A shows said rod 11 with the hollow member 4 acc. to the preferred embodiment of FIG. 1, i.e. with two coil members 2, a spacer 3 and two coil membrane interfaces 7, in an exploded view. As can be seen, the rod 11 engages the walls enclosing the cavities 5 of the elements 2, 3 and 7 of the hollow member 4 in six areas, namely in the center of each short inner wall and at two places at each long inner wall. In this way, none of the elements 2, 3 and 7 of the hollow member 4 can move transversally relative to the rod 11 but only along its longitudinal direction. Other shapes of the rod 11 are possible such as, for example, a shape identical to the cavities 5 of elements 2, 3 and 7 of the hollow member 4. FIG. 7B-7H show the assembly of this hollow member. The general inventive assembly comprises the following steps:

providing at least two coil members 2 each having a coil transversally surrounding a cavity 5 forming a longitudinal passageway and at least one spacer 3 having a cavity 5 with the same shape as the cavity 5 of the at least two coil members 2;

providing a hollow member assembly rod 11 dimensioned to engage the cavities 5 of the at least two coil members 2 and the at least one spacer 3 in several areas such that the at least two coil members 2 and the at least one spacer 3 cannot move transversally to the rod 11;

providing two hollow member assembly end pieces 12 having a cavity for receiving the hollow member assembly rod such that the hollow member assembly end pieces cannot move transversally to the rod;

consecutively putting the first hollow member assembly end piece 12,
the first of the at least two coil members 2,
the at least one spacer 3,
the second of the at least two coil members 2, and
the second hollow member assembly end piece 12 on the hollow member assembly rod 11 with glue between the members being enclosed by the two hollow member assembly end pieces 12;

compressing the first and second hollow member assembly end pieces 12;

removing the second hollow member assembly end piece 12 from the hollow member assembly rod 11; and removing the hollow member 4 comprising the at least one spacer 3 and the first and second coil members 2 from the hollow member assembly rod 11.

In the case of the preferred embodiment acc. to FIGS. 1, 6 and 7A-7H additionally comprising two coil membrane interfaces 7 the step of providing at least two coil members 2 each having a coil transversally surrounding a cavity 5 forming a longitudinal passageway and at least one spacer 3 having a cavity 5 with the same shape as the cavity 5 of the at least two coil members 2 is followed by the step:

providing two coil membrane interfaces 7 having a cavity 5 with the same shape as the cavity 5 of the at least two coil members 2 and the at least one spacer 3;

the step of putting the hollow member assembly end piece 12 on the hollow member assembly rod 11 is followed by the step:

putting the first coil membrane interface 7 on the hollow member assembly rod 11; and the step of putting the second of the at least two coil members 2 on the hollow member assembly rod 11 is followed by the step:

putting the second coil membrane interface 7 on the hollow member assembly rod 11.

(iii) Assembly Overall Actuator

Figure 8A:
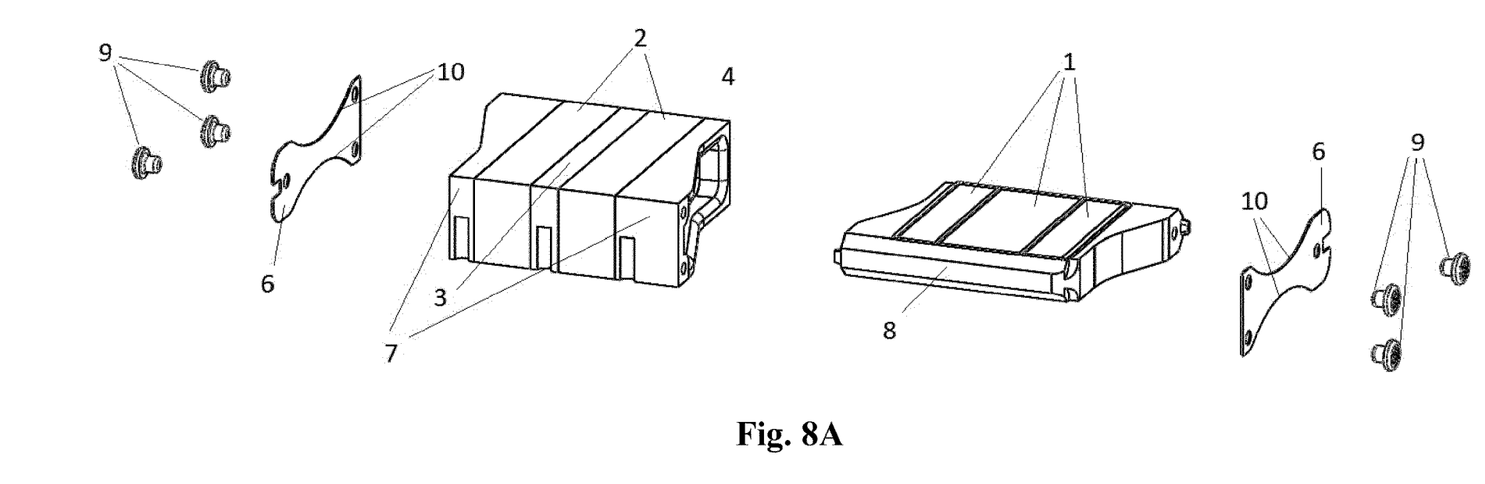
FIG. 8A shows the assembled hollow member, the assembled magnet arrangement, the two membranes and the means for fixing the membranes to the outer sides of the magnet arrangement and the hollow member before assembly.
Figure 8B:
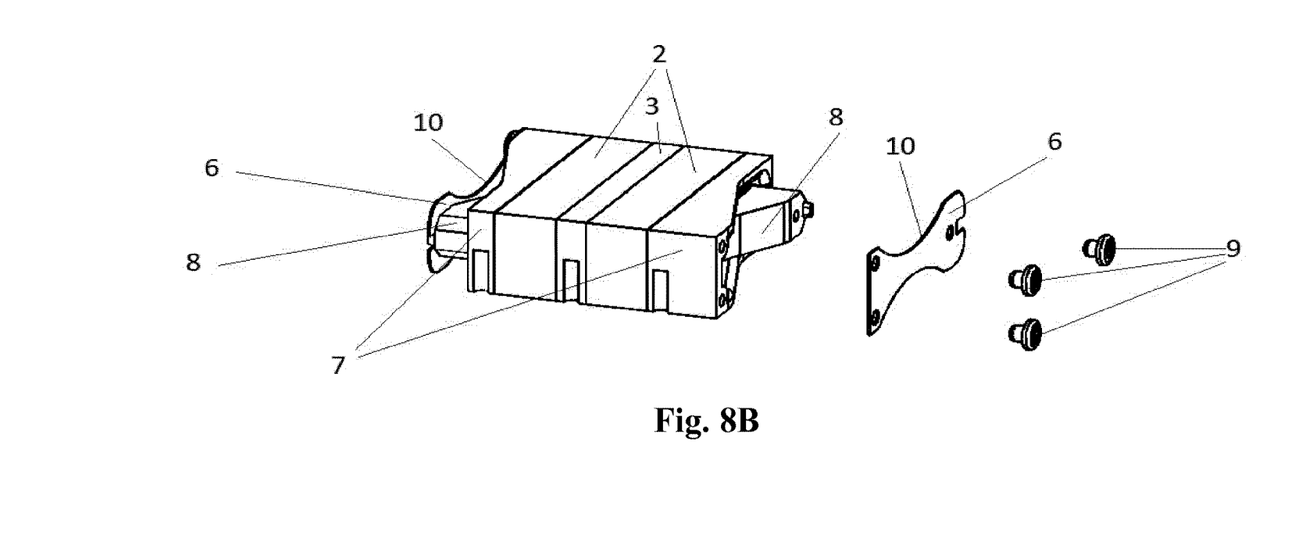
FIG. 8B shows the arrangement of FIG. 8A, wherein now the magnet arrangement has been inserted into the hollow member.
Figure 8C:
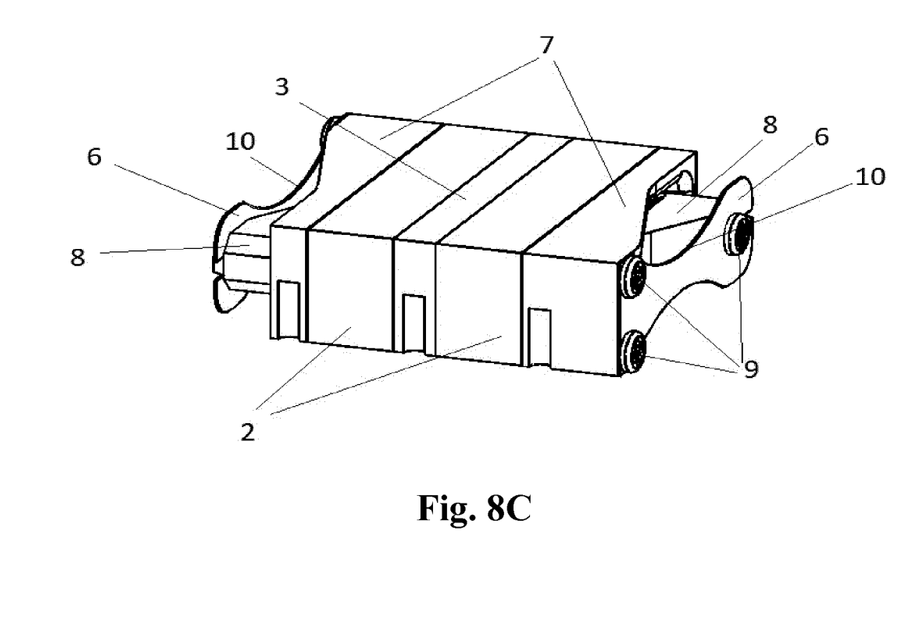
FIG. 8C shows the arrangement of FIG. 8B, wherein now the membranes have been mounted to the outer sides of the magnet arrangement and hollow member with the fixing means.

FIG. 8A-8C show the assembly of the overall actuator acc. to the preferred embodiment of FIG. 1 with three magnets 1, two coil elements 2 and a spacer 3. The general inventive assembly comprises the following steps:

inserting the magnet arrangement assembled according to the above into the hollow member 4 assembled according to the above;

attaching elastic means 6 interconnecting the magnet arrangement and the hollow member 4 on both longitudinal outer ends via attachment means 9.

As mentioned above, the inventive vibrating actuator can be used in a variety of applications including, but not limited to, high-definition haptic feedback to create immersive experiences for video, gaming and music and other immersive experiences. Generally, the vibrator can be used in all applications where a vibratory feedback is desirable, wherein this feedback is not limited to an input to a human user but can also be addressed to a device.

The invention claimed is:

1. A vibrating actuator, comprising:
a magnet arrangement including at least one magnet;
a hollow member comprising at least one coil member with a coil transversally surrounding a cavity forming a longitudinal passageway for receiving the magnet arrangement and permitting a longitudinal relative movement between the hollow member and the magnet arrangement; and
elastic elements interconnecting the magnet arrangement and the hollow member, wherein:
the elastic elements consist of two elastic elements which are thin membranes having an oblong shape with transversal indentations on their opposite long sides;
each of the magnet arrangement and the hollow member has a corresponding first longitudinal end and a corresponding second longitudinal end;
the magnet arrangement has (i) a first longitudinal extension on the corresponding first longitudinal end at a first corner of the magnet arrangement and (ii) a second longitudinal extension on the corresponding second longitudinal end at a second corner of the magnet arrangement, wherein the second longitudinal extension is diagonal from the first longitudinal extension;
the hollow member has (i) a first corner on the corresponding first longitudinal end transversally opposite the first longitudinal extension of the magnet arrangement and (ii) a second corner on the corresponding second longitudinal end transversally opposite the second longitudinal extension of the magnet arrangement;

a first of the two elastic elements is connected between the first longitudinal extension of the magnet arrangement and the first corner of the hollow member; and a second of the two elastic elements is connected between the second longitudinal extension of the magnet arrangement and the second corner of the hollow member.

2. The vibrating actuator of claim 1, wherein each elastic element is flat and the indentations have a concave or polygonal shape.

3. The vibrating actuator of claim 1, wherein the elastic elements are made of copper beryllium.

4. The vibrating actuator of claim 1, wherein the magnet arrangement comprises two magnets arranged with same polarities facing each other and wherein the hollow member comprises one coil member.

5. The vibrating actuator of claim 1, wherein the magnet arrangement comprises three magnets arranged with same polarities facing each other and wherein the hollow member comprises two coil members and a spacer.

6. The vibrating actuator of claim 5, wherein coil membrane interfaces are provided at the longitudinal outer ends of the coil members.

7. The vibrating actuator of claim 1, wherein the magnet arrangement further comprises a magnet frame at least partially enclosing the at least one magnet.

8. The vibrating actuator of claim 1, wherein the hollow member is fixed to a chassis and stationary and the magnet arrangement performs a linear longitudinal vibratory movement.

9. The vibrating actuator of claim 1, wherein the magnet arrangement is fixed to a chassis and stationary and the hollow member performs a linear longitudinal vibratory movement.

10. The vibrating actuator of claim 1, wherein the magnet arrangement and the hollow member are flat and rectangular.

11. The vibrating actuator of claim 1, wherein the magnet frame and the hollow member are attached using screws.

12. The vibrating actuator of claim 1, wherein the elastic elements have a bone-like structure.

13. The vibrating actuator of claim 1, wherein the magnet arrangement comprises a magnet frame made of a rigid material.

14. The vibrating actuator of claim 13, wherein the frequency response of the vibrating actuator can be adjusted by choice of the rigid material.

15. The vibrating actuator of claim 1 having a cylindrical shape.

16. The vibrating actuator of claim 1, wherein the hollow member comprises two coils having a spacer in between them.

17. The vibrating actuator of claim 1, wherein the magnets in the magnet arrangement are glued together inside the magnet frame with same polarities of the magnets facing each other.

18. The vibrating actuator of claim 1, wherein the hollow member comprises at least two coils, a spacer, and at least two coil membrane interfaces.

19. The vibrating actuator of claim 18, wherein the hollow member is formed by placing at least two coils with a cavity inside to fit the space and providing an interface member on each of the at least two coils.

20. The vibrating actuator of claim 1, wherein:
the longitudinal passageway of the hollow member has open ends for receiving the magnet arrangement and permitting the longitudinal relative movement between the hollow member and the magnet arrangement; and
the elastic means are fixed to the open ends of the hollow member.

21. The vibrating actuator of claim 20, wherein:
each elastic element has only a single pair of transversal indentations on its opposite long sides; and
each elastic element has a central portion without any opening.

22. The vibrating actuator of claim 1, wherein each elastic element has only a single pair of transversal indentations on its opposite long sides.

23. The vibrating actuator of claim 22, wherein each elastic element has a central portion without any opening.

24. The vibrating actuator of claim 23, wherein:
the longitudinal passageway of the hollow member has open ends for receiving the magnet arrangement and permitting the longitudinal relative movement between the hollow member and the magnet arrangement;
the elastic means are fixed to the open ends of the hollow member;
each elastic element has only a single pair of transversal indentations on its opposite long sides; and
each elastic element has a central portion without any opening.

25. The vibrating actuator of claim 7, wherein the first and second longitudinal extensions are located at diagonally opposing first and second corners of the magnet frame.

* * * * *